United States Patent
Brown et al.

[11] Patent Number: 5,941,169
[45] Date of Patent: Aug. 24, 1999

[54] BALE THROWER CONTROL SYSTEM

[75] Inventors: Floyd Ernest Brown, Bloomfield; Patrick Augie, Ottumwa; Thomas Cedric Boe, Cedar Falls, all of Iowa

[73] Assignee: Deere & Company, Moline, Ill.

[21] Appl. No.: 09/026,369

[22] Filed: Feb. 19, 1998

[51] Int. Cl.⁶ .............................. B30B 9/30; B30B 15/32; B65G 31/00
[52] U.S. Cl. .............................. 100/188 OBT; 198/641; 414/335; 414/525.1
[58] Field of Search .................... 100/188 R, 188 BT; 198/638, 639, 641; 414/335, 344, 389, 525.1

[56] References Cited

U.S. PATENT DOCUMENTS

| Re. 27,657 | 6/1973 | Soteropulos et al. |  |
|---|---|---|---|
| 3,387,725 | 6/1968 | May et al. | 100/188 BT |
| 3,521,766 | 7/1970 | Soteropulos et al. | 100/188 BT |

*Primary Examiner*—Stephen F. Gerrity

[57] ABSTRACT

A baler for making parallelepiped bales is equipped with a bale ejector or thrower structure including a bale throwing pan supported by a four-bar linkage that is swung upwardly by a hydraulic throwing cylinder. A control valve structure including a solenoid-operated trip valve and a solenoid-operated pressure-relief valve is actuated for effecting pressurization of the throwing cylinder and throwing of a bale in response to a trip switch being closed in response to a trip pedal being rotated by a bale moving rearwardly on the throwing pan as it exits the baler bale chamber, the trip valve when actuated blocking a source of fluid pressure from normal communication with a fluid sump, and the pressure-relief valve when actuated being operable for maintaining the working fluid pressure at a value determined by a variable potentiometer connected in circuit with the solenoid of the pressure relief valve. The pressure of the fluid available for operating the throwing cylinder and, hence, the distance through which a given bale will be thrown, depends on the setting of the relief valve achieved through adjustment of the variable potentiometer. An interlock circuit is provided for preventing actuation of the throwing cylinder in the event that a shield structure, which surrounds the area occupied by the throwing pan, is lifted to an inoperative position, such lifting opening an interlock switch. An interlock relay switch is provided which, when energized, maintains the availability of power to a power port of a timer coupled for receiving a control signal when the trip switch is tripped, the signal acting to change the state of the timer so that it connects power to the trip and pressure-relief valve solenoids for a preset time, the interlock relay switch acting to open the current path to the timer power input port in response to the interlock switch moving to its normally open position in response to the shield structure being raised to a non-working position.

5 Claims, 3 Drawing Sheets

BALE THROWER CONTROL SYSTEM

BACKGROUND OF THE INVENTION

The present invention relates to a bale handling apparatus, a so-called bale ejector or thrower, including a pan positioned for receiving a completed bale, as it is pushed from a bale-forming case of a baler by material being compacted for forming the next bale, and for throwing the bale through the air into a trailing wagon towed by the baler, and more specifically, relates to a system for controlling the bale thrower.

In a known bale ejector, pressurized fluid is routed to a hydraulic throwing cylinder for causing the cylinder to quickly extend and operate a pan suspension linkage for causing the pan to go through a throwing motion so as to propel a bale, resting on the pan, through the air. A spool valve is used for controlling passage of the pressurized fluid to the cylinder, this valve including a spool having an exposed end to which a trip bar is coupled. Actuation of the valve is accomplished through a trip linkage coupled between the trip bar and a trip pedal, the latter being positioned for contact by a bale when correctly positioned on the pan for launch. A reset linkage operates in response to pan movement to reset the trip linkage for the next cycle. A manually-operable lockout bar is provided for selectively preventing operation of the throwing cylinder, as when shields for preventing bystanders from entering the launch zone are raised for permitting service, for example. The distance through which the cylinder will cause a bale to be thrown may be varied by operation of an adjustable relief valve which adjusts the pressure of the fluid routed to the throwing cylinder.

The known bale thrower suffers from the drawbacks of the exposed valve spool being subject to corrosion during extended periods of non-use and of the various linkages for controlling operation of the valve spool requiring adjustments which are difficult to make and/or to understand. Improper adjustment may result in the hydraulic valve becoming damaged causing it to malfunction resulting in additional damage and associated costs.

U.S. Patent No. Re. 27,657, issued on Jun. 5, 1973 to Soteropulos, discloses a basic bale ejector design featuring a pan suspended on throwing arms caused to be moved through a throwing motion by a hydraulic cylinder actuated in response to actuation of a control valve through the action of a valve control linkage operated by a trip pedal pivoted by a bale as it becomes properly positioned on the throwing pan.

SUMMARY OF THE INVENTION

According to the present invention there in provided an improved bale thrower, and more particularly, there is provided an improved system for controlling operation of the thrower.

A broad object of the invention is to provide a simple, reliable control system for a bale thrower.

A more specific object of the invention is to provide a control system for a bale thrower of a type including a control valve selectively operable for causing pressurization of the throwing cylinder, with the control valve being constructed so as to not have exposed valve stems subject to corrosion.

Yet a more specific object of the invention is to provide a control system, as set forth in the immediately preceding object, wherein an electrohydraulic valve is provided for selectively effecting pressurization of fluid coupled to the throwing cylinder, the valve including a valve spool located entirely within the valve body and operated by energizing a solenoid.

Yet another object of the invention is to provide an electrohydraulic metering valve for varying the pressure of the fluid coupled to the throwing cylinder for the purpose of varying the distance through which a bale may be propelled by rapid extension of the throwing cylinder.

Still another object of the invention is to provide an interlock which automatically prevents actuation of the throwing cylinder if the shield for preventing access to the launch zone of the throwing mechanism is raised to an inoperative position.

These and other objects will become apparent from a reading of the ensuing description together with the appended drawings.

DESCRIPTION OF THE PREFERRED EMBODIMENT

Figure 1:
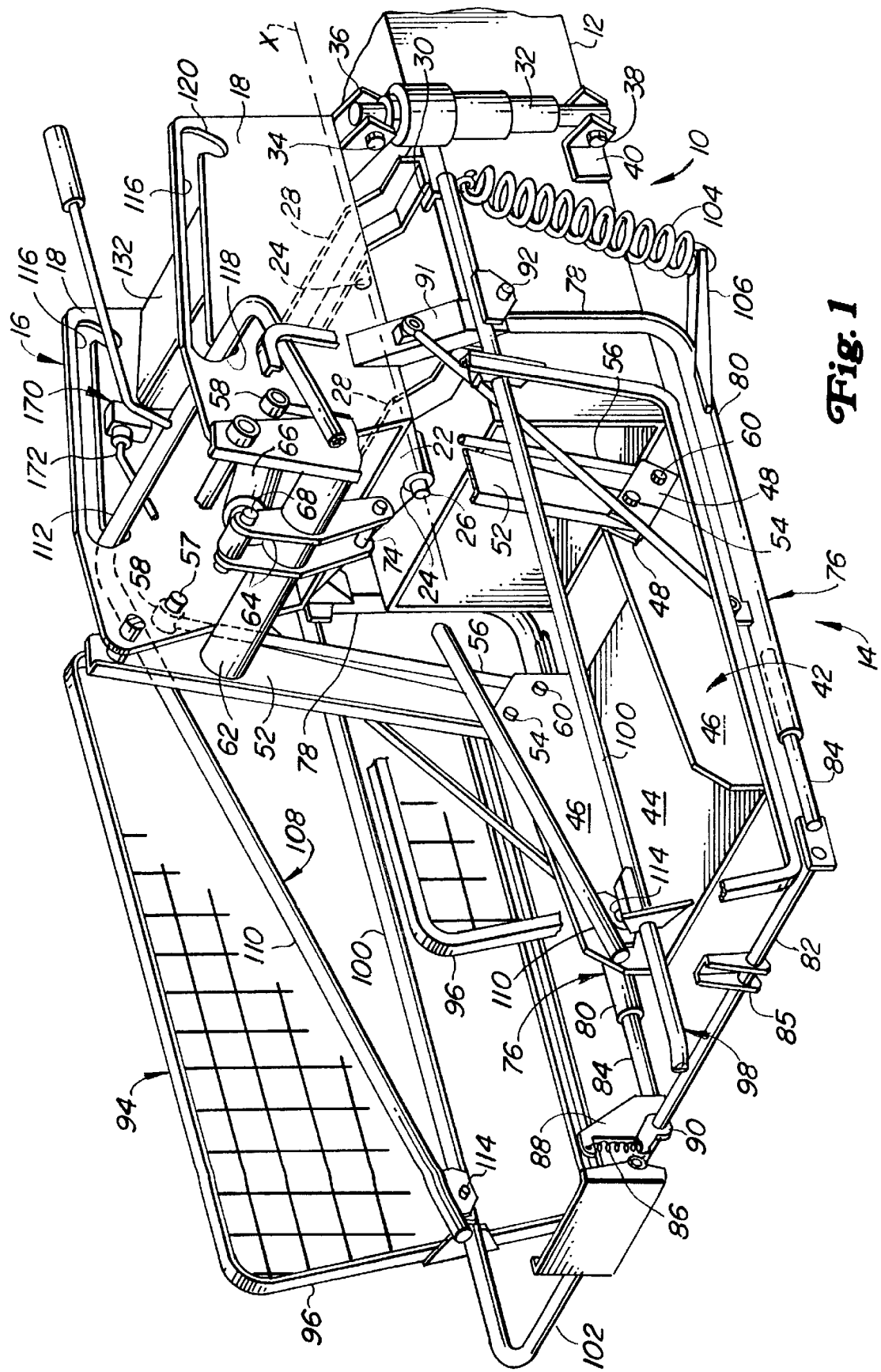
FIG. 1 is a right rear perspective view showing the rear portion of a baler, for forming parallelepiped bales, equipped with a bale ejector of the type with which the present invention is particularly adapted for use.
Figure 2:
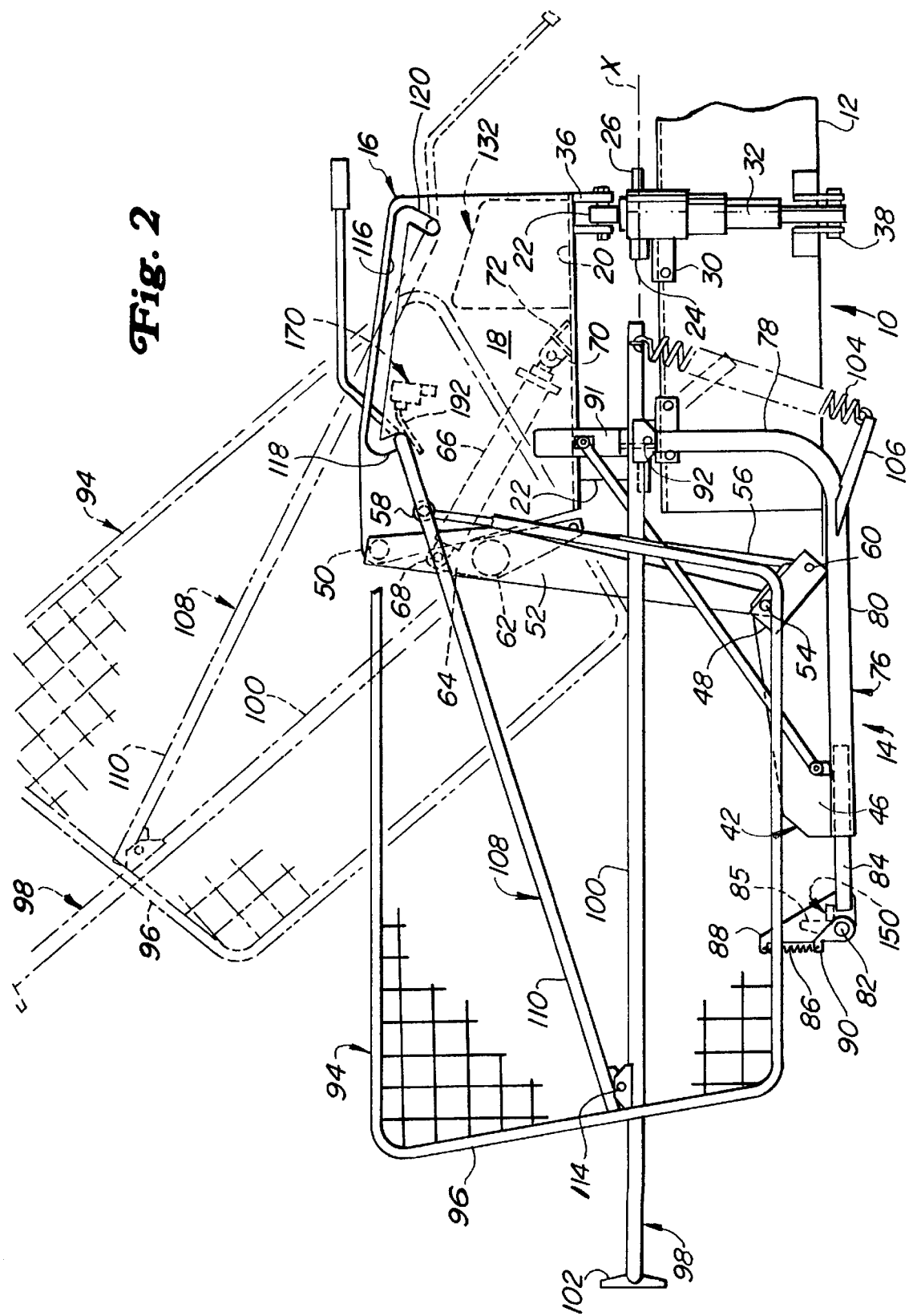
FIG. 2 is a right side elevational view showing the rear end of the baler and the bale ejector disclosed in FIG. 1, with the ejector shield being shown in solid lines in a lowered, working position, and being shown in dashed lines in a raised inoperative position.

Referring now to FIGS. 1 and 2, there is shown a rear end of a baler 10 including a bale case 12 supporting a bale ejector 14. Specifically, the bale ejector 14 includes a support frame 16, having a width approximately equal to that of the bale case 12, comprising a pair of parallel, transversely spaced, vertical side walls 18 joined to and projecting upwardly from a horizontal bottom wall 20. A pair of mounting members 22, each in the form of an isosceles triangle, are respectively fixed to front and rear underside locations of the bottom wall 20, with a long side of each triangle extending transversely across the bottom wall 20 and with the equal sides extending downwardly and inwardly to an apex to which a fore-and-aft extending, horizontal pin receptacle 24 is secured, the receptacles 24 being aligned with each other along a pivot axis X and each receptacle being in the form of a cylindrical tube. Received in each pin receptacle 24, and establishing a support about which the frame 16 may pivot, is a pin 26 forming part of a mounting bracket 28 including an angle member arched transversely over the bale case 12 and having right-angular mounting pads 30 at opposite ends respectively engaging and being bolted to opposite upper corners of the bale case. For a purpose explained below, the bale ejector 14 is selectively tiltable about the axis X by an electric, extensible and retractable tilt actuator 32 having its upper end pivotally coupled, as at 34, to a bracket 36 fixed to a lower right-hand front corner of the ejector frame 16 and having its lower end pivotally coupled, as at 38, to a bracket 40 fixed to a lower location of the bale case 12.

The bale ejector 14 further includes a channel-like throwing pan 42, which, as considered in its lowered, bale-receiving position shown in FIGS. 1 and 2, is disposed rearwardly of the bale case 12 with a horizontal surface 44 (FIG. 2) thereof being disposed for receiving a bale as it exits the bale case. Respectively fixed to outer forward portions of opposite sides 46 of the pan 42 are a pair of connection brackets 48, in the form of short channel members. A rock shaft 50 extends through and is rotatably mounted in upper rear corner locations of the ejector frame side walls 18. Respectively fixed to opposite ends of the rock shaft 50 are upper ends of a pair of bale throwing arms 52, with lower ends of the arms 52 being pivotally connected, as at 54, to a rear location of a respective one of the connection brackets 48. Extending parallel to each of the bale throwing arms 52 is a guide link 56 having its upper end pivotally connected, as at 58, to one of the side walls 18 and having its lower end pivotally connected, as at 60, to one of the connection brackets 48. The throwing arms 52 are joined together, at a location spaced downwardly from the rock shaft 50, by a horizontal, tubular cross member 62. Fixed to the cross member 62, at a central location between opposite ends of the cross member, are pair of transversely spaced upright plates 64 which extend both upwardly and downwardly from the cross member. A hydraulic throwing cylinder 66 has its rear end received between and pivotally mounted, as at 68, to upper ends of the plates 64, and has its forward end pivotally mounted, as at 70, to a bracket 72 fixed to the bottom wall 20 of the ejector frame 16. Thus, it will be appreciated that extension of the throwing cylinder 66 will result in the throwing arms 52, and hence the pan 42, being propelled upwardly about the axis of rotation defined by the rock shaft 50, with the pan 42 remaining oriented substantially horizontally when the cylinder 66 is fully extended. A pin 74 (FIG. 1) extends between and is retained by lower ends of the plates 64, the pin 74 being selectively engagable by a hook, carried by a latch arm (not shown) that is pivotally mounted to the ejector frame bottom wall 20, for latching the pan in its upward position for service, for example.

The bale ejector 14 further includes a trip pedal support frame that includes a pair of parallel, transversely spaced, right-angular support members 76 having upright first legs 78 respectively forming forward continuations of a pair of fore-and-aft extending generally horizontal second legs 80. A horizontal transverse trip pedal rockshaft 82 extends between and is rotatably mounted in respective plates defining rear ends of a pair of telescopic extensions 84 of the legs 80. A pedal 85 is fixed to and projects upwardly from the rockshaft 82. The support members 76 of the trip pedal support frame are dimensioned and mounted such that the pedal 85 is located so as to be in the path of rearward movement of a bale as the latter becomes properly positioned on the pan 42 for being thrown, the pedal being pivoted when contacted by the bale so as to trigger operation of the throwing cylinder 66, in a manner explained in detail below. The telescopic extensions 84 are for the purpose of selectively changing the distance of the trip pedal 85 from the pan 42 to accommodate bales of different length. The pedal 85 is yieldably held in its normal upright position, as shown, by a coil tension spring 86 acting between a plate 88, serving also as the plate in which the left-hand end of the trip pedal rockshaft 82 is rotatably mounted, and a spring mounting tab 90 fixed to the rockshaft 82. The upright first legs 78 of the pair of trip pedal support members 76 are respectively received in respective sockets defined by a pair of downwardly opening receptacles 91 that are respectively fixed to outer lower locations of the opposite side walls 18 just forwardly of the rear mounting member 22 of the ejector support frame 16. The legs 78 are held in the receptacles 91 by respective fasteners 92.

To keep bystanders away from the vicinity of the action of the bale throwing elements, a shield structure 94 is provided. The structure 94 includes right- and left-hand upright side shields 96, each including a trapezoidal frame to which a grid of wire mesh is secured. The side shields 96 are interconnected by a generally horizontal, u-shaped bumper structure 98 including right- and left-hand legs 100, respectively bolted to front and rear portions of the respective frames of the right- and left-hand shields 96 and being joined together by a transverse bumper section 102 spaced rearwardly of the side shields 96. The fasteners 92 that mount the trip pedal support members 76 to the receptacles 91 also serve to pivotally mount the side shields 96 to the respective exteriors of the receptacles 91, the fasteners 92 lying along a horizontal transverse pivot axis about which the shield structure 94 is pivotable between a lowered operative position, as shown in solid lines in FIGS. 1 and 2, and a raised inoperative position, as shown in dashed lines in FIG. 2. Forward end portions of the bumper structure legs 100 extend forwardly beyond the receptacles 91, and provided for counterbalancing the weight of the shield structure 94 about the pivotal axis defined by the fasteners 92 are a pair of counterbalance springs 104, in the form of a pair of coil tension springs having their respective upper ends coupled to the forward ends of the legs 100 and their respective lower ends respectively coupled to a pair of spring-mounting brackets 106 respectively welded to forward underside locations of the horizontal legs 80 of the trip pedal support member 76. Provided for selectively retaining the shield structure 94 in either its working position or in its operative position is a u-shaped bail member 108 having opposite legs 110 joined by a transverse bight portion 112. The rear ends of the legs 110 are respectively pivotally mounted, as at 114, to the legs 100 of the bumper structure 98 at respective locations adjacent rear ends of the shield frames 96. The bight portion 112 extends through a fore-and-aft elongated guide slot 116 provided in each of the ejector frame side walls 18, the slots 116 each having a rear end defined by a downwardly and forwardly extending first latch section 118, in which the bight portion 112 is received when the shield structure 94 is in its working position, and having a forward end defined by a downwardly and rearwardly extending second latch section 120, in which the bight portion 112 is received for holding the shield structure 94 in its raised inoperative position. Thus, it will be appreciated that the shield structure 94 may be manually raised to its inoperative position once the bail member 108 is raised to disengage its bight portion 112 from the first latch section 118 of each of the slots 116, the bight portion then sliding along the slots 116 as the shield structure is raised until the bight portion reaches and is positioned in the second latch section 120 of the each of the slots 116 to thereby hold the shield structure 94 in its raised inoperative position.

Figure 3:
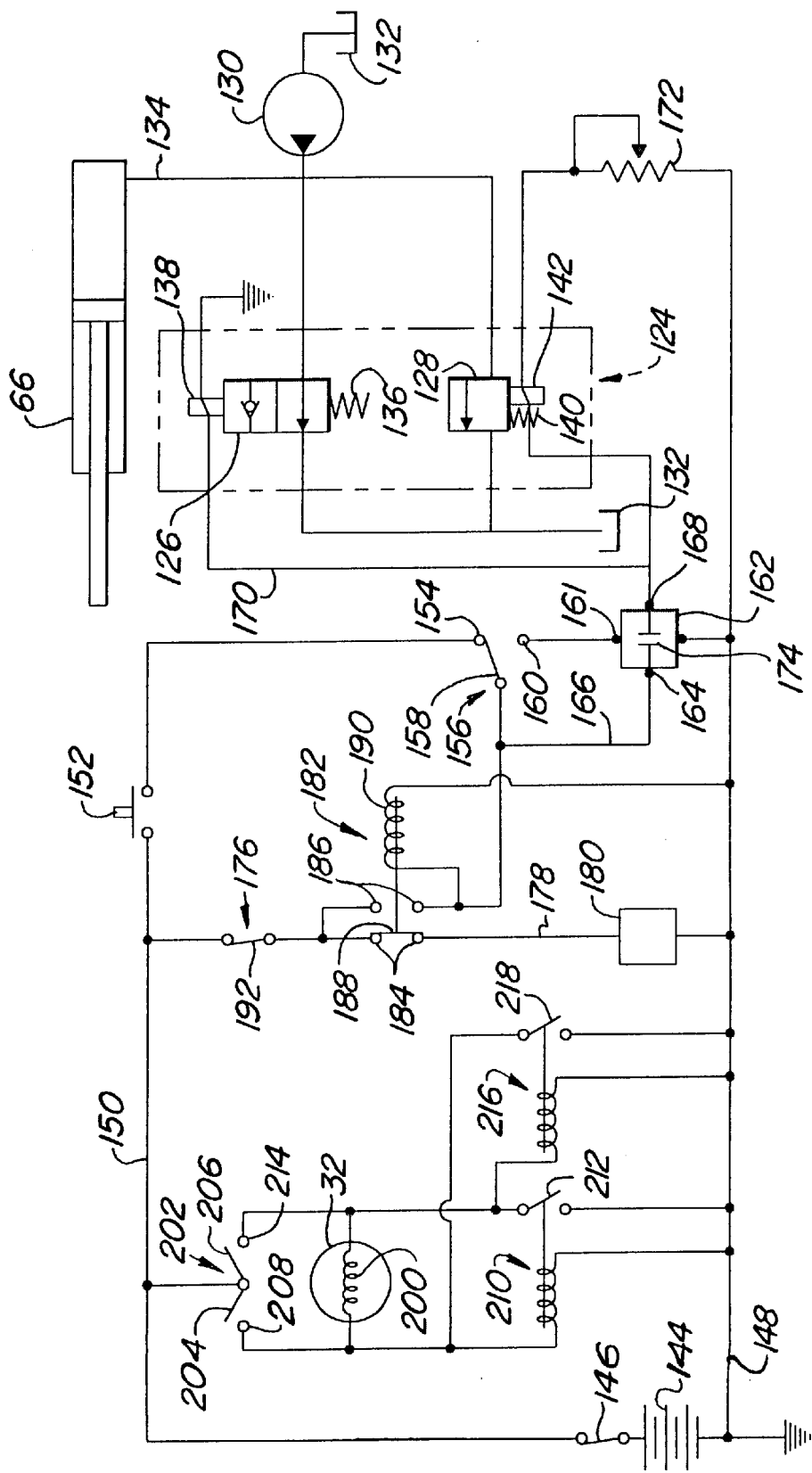
FIG. 3 is a schematic of the electrical and hydraulic circuits for controlling the various functions of the bale ejector.

Referring now to FIG. 3, there is shown an electrohydraulic control circuit 122 for controlling operation of the electrical tilt actuator 32 and the hydraulic throwing cylinder 66. Specifically, the circuit 122 includes a throwing cylinder control valve assembly 124 comprising a solenoid-operated, two-position trip valve 126 and a solenoid-operated, variable-pressure relief valve 128. A pump 130 has its inlet coupled to a sump 132 and has its outlet coupled, as by a branched supply line 134, to respective inlets of the trip and relief valves 126 and 128, and to the throwing cylinder 66. The trip valve 126 includes a spring 136 which biases the trip valve 126 to a normal "drain" position wherein it couples the cylinder 66 to the sump 132, and includes a trip solenoid 138 which, when energized, overcomes the bias of the spring 136 and moves the trip valve 126 to a "trip" position wherein it blocks the passage of fluid pressure to the sump 132 thus making the pressure available for actuating the throwing cylinder 66.

The amount of pressure available for actuating the cylinder 66, and hence for selecting the distance that a given bale will be thrown, is determined by the relief valve 128. Specifically, the relief valve 128 includes a spring 140 and a relief solenoid 142 which operate in opposition to each other to establish the working pressure that will be maintained in the branched supply line 134. When the solenoid 142 is de-energized, the spring 140 will establish a maximum working pressure in the supply line 134 when the trip valve 126 is in its "trip" position. The current available to energize the solenoid 142 is variable, in a manner explained below, and as the current is increased, the working pressure maintained in the supply line 134 is decreased.

The trip and relief solenoids 138 and 142 are simultaneously energized by an electrical circuit including a source of electrical power, here shown as a battery 144, which would normally be the battery of the towing tractor. The battery 144 is connected to an outlet (not shown) into which the wiring harness of the baler electrical circuit is plugged and to which power is connected by a circuit completed when the tractor ignition switch is turned on, for example, this connection been represented functionally by a main, on-off power switch 146. This outlet is also coupled to ground through a ground lead 148 that is coupled to the battery 144. Connected so as to be selectively energized or de-energized by operating the power switch 146 to its "on" or "off" positions is a power lead 150 which contains a normally open, manually operable reset switch 152. On the opposite side of the reset switch 152 from the power switch 146, the power lead 150 is connected to a first contact 154 of a bale-operated trip switch 156 having a switch element 158 normally engaged with the contact 154 but being moved into engagement with a second contact 160 by operation of the trip pedal 85 when a bale moves into position for being thrown. The second contact 160 is connected to a control signal input port 161 of a timer 162 connected to the ground lead 148. The timer 162 has a power input port 164 coupled to the switch element 158 by a branched lead 166 and has a power output port 168 coupled to a branched lead 170 that is, in turn, coupled to the trip valve solenoid 138 and the pressure relief valve solenoid 142, which is connected to the ground lead 148 by a lead containing a variable resistor 172 that determines the pressure of the working fluid in the branched line 134. The timer 162 is of known type which operates, when power is available at the power input port 164, to complete a circuit through a switch device 174 in response to receiving an electrical control signal at the control signal input port 161, the duration of this completed circuit being adjustable. In the preferred embodiment, the preset time duration may be between 0.3 and 0.7 seconds depending on the speed of operation of the extension stroke of the throwing cylinder 66.

In order to prevent the cylinder 66 from operating when the safety shield structure 94 is in its raised position, a normally open interlock switch 176 is located in a reset alarm power lead 178 extending between the power lead 150 and the ground lead 148 and containing a reset alarm 180 in series with the switch 176. An interlock relay switch 182 includes a first set of contacts 184 in series between the switch 176 and the alarm 180 and a second set of contacts 186 connected in parallel with the contacts 184 in the branched lead 166 which is connected to the lead 178 at a location between the switch 176 and the contacts 184. The relay switch 182 includes a switch element 188 which is normally engaged with the contacts 184 so as to complete the circuit containing the alarm 180 when the interlock switch 176 is closed. Upon energization of a coil 190 of the relay switch 182, the switch element 188 shifts to open the contacts 184 and close the contacts 186. It is to be noted that the interlock switch 176 is mounted on one of the support frame side walls 18 adjacent the rearward end 118 of the guide slot 116. When the bail member 108 is in the guide slot rearward ends 118, as can best be seen in FIG. 1, the bight 112 of the bail member engages a switch element 192 of the switch 176 and holds it in a closed position, as shown in FIG. 3.

Thus, assuming an initial condition where the power switch 146 is closed, the reset switch 152 is open and the shield structure 94 is in its lowered operative position, the switch element 192 will be closed and the switch element 188 will be engaged with the contacts 184 so as to establish a current path through the reset alarm 180. The operator will then know that the shield structure 94 is properly positioned for bale throwing operation. The operator will then momentarily close the reset switch 152 which will result in the interlock relay switch coil 190 being energized so as to cause the switch element 188 to open the contacts 184 and close the contacts 186. Current will then no longer flow to the alarm 180 and its actuation will cease. Power will now be coupled to the power port 164 of the timer 162. Next, assume that a completed bale moves from the bale case 12 and slides rearwardly along the pan 42 until it contacts and pivots the trip arm 85 so as to cause the trip switch element 158 to move into engagement with the contact 160. Power will then be coupled to the control signal port 161 of the timer 162 which results in the timer switch device 174 being closed to energize the output port 168 and, hence, the trip valve solenoid 138 and the pressure relief valve solenoid 142. The valve 126 will then shift to block the flow of the pump 130 from the reservoir 132 thus making the fluid pressure available for effecting extension of the cylinder 66 to cause the pan 42 to be propelled upwardly so as to launch the bale resting on it. With the bale gone, the trip switch element 158 returns to its position in engagement with the contact 154, thus removing the control signal from the port 161. The timer 162 will then time out and change the state of the switch device 174 so that it opens. This time will approximately be the time that it takes the throwing cylinder 66 to completely extend. With the switch device 174 open, valve solenoids 138 and 142 will be de-energized resulting in the operating pressure being connected to the sump, whereupon the cylinder 66 will lose its pressure and the weight of the pan 42 and associated structure will cause it to collapse the cylinder 66 while the pan 42 gravitates back to its initial position for receiving the next completed bale. The distance a bale is launched will be determined in accordance with the setting of the variable resistor 172, with increased resistance resulting in decreased operating pressure since the relief valve 128 will overcome the resistance of the spring more easily when the force exerted by the solenoid is increased.

If the shield structure 94 is then elevated to a non-working position, the interlock switch 176 will move to its normally open position. This will result in the flow of power to the coil 190 of the interlock relay switch 182 being disrupted with the result that the switch element 188 will move to its normal position in engagement with the set of contacts 184. If the trip switch 156 is then actuated to bring the element 158 into engagement with the contact 160, no current will be available at the control signal port 161 or at the power input port 164 of the timer 162 and no energization of the valves 126 and 128, and, hence, no actuation of the bale throwing cylinder 66 will take place.

The tilt motor 32 is reversible and includes a coil 200 to which is coupled a single-pole, double-throw, momentary tilt control switch 202 connected to the power lead 150 and including first and second switch elements 204 and 206 which are normally biased to a centered "off" position, as shown. To tilt the ejector structure 14 in a first direction, the switch 202 is rocked in a first direction to bring the switch element 204 into engagement with a first power contact 208, connected to a first end of the coil 200, and with a coil of a relay switch 210 having a switch element 212 connected to complete the circuit through the motor 32 when the relay switch 210 is energized. Rocking the switch 202 in a second direction results in the switch element 206 coming into contact with a second power contact 214, connected to an opposite end of the motor coil 200 from that to which the power contact 208 is connected, and with the coil of a relay switch 216 having a switch element 218 located for completing a circuit for reversing the flow of current through the motor coil 200 when the relay switch 216 is energized. Thus, with reference to FIG. 1, movement of the switch element 204 in the first direction results in the tilt motor 32 being actuated so that it retracts and pivots the ejector structure 14 clockwise about the axis X so that ejected bales will be thrown rightwardly relative to the axis X. Movement of the switch element 206 in the second direction results in the tilt motor 32 being actuated so that it extends and pivots the ejector structure 14 counterclockwise about the axis X so that ejected bales will be thrown leftwardly relative to the axis X.

We claim:

1. In a combination of a baler, for forming parallelepiped bales, including a bale case having a bale discharge area from which successive bales of harvested crop exit during operation of the baler, and a bale ejector including: a frame mounted to the bale case, a bale throwing pan mounted to the frame by a support linkage for swinging movement between a lower position, wherein the pan is located for receiving a finished bale as it exits said discharge area of the bale case, and an upper position to which the pan accelerates for throwing a bale, a hydraulic bale throwing cylinder coupled between said bale case and said support linkage, a hydraulic pressure fluid control circuit coupled to said throwing cylinder and comprising a throwing cylinder control valve assembly including a trip valve element shiftable between first and second positions for respectively coupling said throwing cylinder to, or blocking the throwing cylinder from, a sump, and a trip valve control including a trip pedal located for engagement and movement to a trip position, by a bale, resulting in the trip valve element shifting to its second position when the bale moves into a position for being thrown, the improvement comprising: said valve element being located entirely within a body of said throwing cylinder control valve assembly; said trip valve being solenoid-operated with a trip valve solenoid being coupled to said valve element; a spring biasing said valve element to said first position when the solenoid is de-energized; said valve element being movable to its second position in response to said solenoid being energized; an electrical circuit embodying said solenoid, an electrical power source and a trip switch; and said trip switch being located for being moved from a normal initial position to a tripped position connecting said power source to said trip valve solenoid in response to said trip pedal being moved from a standby position to its tripped position.

2. The combination defined in claim 1 wherein said hydraulic control circuit further includes a solenoid-operated variable pressure relief valve connected in said hydraulic circuit and including a relief valve solenoid operable in response to increasing electrical current values to respectively establish decreasing relief pressure values, thereby changing the operating pressure of the throwing cylinder such as to change the distance through which the throwing cylinder will throw a given bale; and a rheostat connected in circuit with said relief valve solenoid for selectively varying the electrical current for actuating said relief valve solenoid.

3. The combination defined in claim 1 and further including a protective cage member configured for bounding a zone traversed by said pan when the latter moves between its lowered and raised positions when said cage member is in a normal lowered working position; said cage member being mounted to said frame for moving vertically between its working position and a raised inoperative position; and said electrical circuit including interlock circuitry comprising a normally open interlock switch mounted for being closed only in response to said cage member being placed in said working position, with the open interlock switch acting for preventing energization of said trip valve solenoid whenever said protective cage member is raised to said inoperative position.

4. The combination defined in claim 1 wherein said trip pedal is released to return to its standby position, when the bale engaged therewith is raised during launching thereof, to thereby release the trip switch so that it returns to its normal initial position; said electrical circuit including a timer having a power input port coupled to said power source, a power output port coupled to said trip valve solenoid, and a control signal port coupled for being energized, when said trip switch is momentarily moved to its tripped position, to establish a current path between said power input and output ports to thereby establish a current path to said trip valve solenoid which remains established for a preselected time determined by a characteristic of the timer.

5. The combination defined in claim 4 and further including a protective cage member mounted for movement between a lowered working position and a raised inoperative position; said cage, when in said working position, being configured for bounding a zone traversed by said pan when said pan moves between its lowered and raised positions; said electrical circuit including interlock circuitry comprising an interlock switch operatively associated with said cage, so as to be closed only when said cage is in its working position, and having an interlock switch element normally disconnected from said source of power; said interlock circuitry further including an interlock relay switch including an interlock relay switch element having a normal unlatched position, in which it is located when a coil of said interlock relay switch is de-energized, and a latched position, which it occupies when said last-named coil is energized; a circuit including a manually-operated reset switch for momentarily connecting power for initially energizing said interlock relay switch coil so as to effect movement of said interlock relay switch element to its latched position wherein it establishes a current path to said interlock relay switch coil when said interlock switch is closed; and said current path through said relay switch element when latched also being coupled for connecting said power input port of said timer to said power source, and, hence to said trip and relief valve solenoids, when said timer has been turned on by receiving a control signal as a result of said trip switch being tripped, whereby when said cage is raised to said inoperative position, the interlock switch will open so as to discontinue current availability for actuating the trip and relief valve solenoids, and, in that way, prevent actuation of said bale throwing cylinder.

* * * * *